Feb. 4, 1958     J. P. LEKAS     2,821,785
PRECISION GEAR CHECKER
Filed Aug. 23, 1954
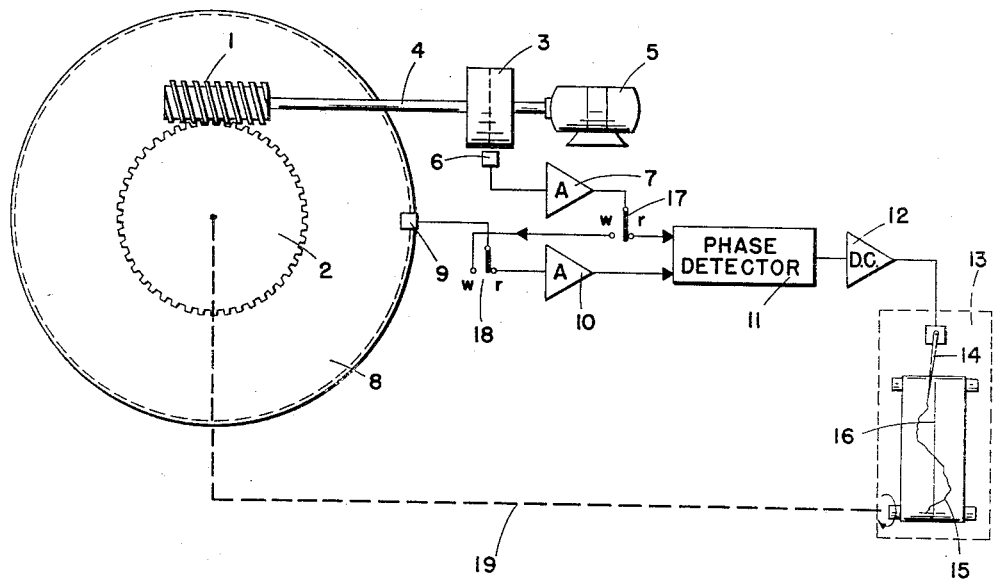
INVENTOR.
JOHN P. LEKAS
BY
ATTORNEY United States Patent Office 2,821,785
Patented Feb. 4, 1958

2,821,785

PRECISION GEAR CHECKER

John P. Lekas, Hollywood, Calif., assignor to North American Aviation, Inc.

Application August 23, 1954, Serial No. 451,628

6 Claims. (Cl. 33—179.5)

This invention relates to a precision gear checker and, in a particular embodiment, a system for determining the eccentricity of a gear.

Precision gears are required in innumerable devices such as analogue computers, astronomical apparatus, instrumentation equipment and laboratory instruments. The purpose of a particular gear drive may be to provide an output which is a precise function of an input. Any irregularity or eccentricity of the gear causes an error in the output function. A desirable gear checker is one which detemines the uniformity of the gear under actual drive conditions. Further, assuming that the primary purpose of a gear train is to provide a given output rotation depending on the input rotation, the gear checker should furnish a ready method of comparison of these two functions. Comparison should be had down to a few seconds of arc of input or output. It has been found that indicating signals can be recorded upon magnetic drums and discs down to several hundred per inch. Mechanical standards possessing such fine indication are costly; and when adapted to gear checking, are cumbersome. The use of magnetic recordings is more economical and is more readily adapted for diverse application. An advantage of gear checking by the method of this invention is that the gear or gear train need not be driven at any particular speed. Also, in one embodiment of the invention, only one of the discs or drums is required to have been calibrated as a reference as compared to two calibrated discs required in other devices. The calibrated reference of this same embodiment may be used for several different gear trains and is not limited to checking gears providing a specific function.

A graph recording is made of the results indicated by this system and analysis can then be made of the errors and eccentricity of the gear. Any necessary relocation of the gear axis can be determined from the graphical recording which will portray the irregularities.

It is therefore an object of this invention to provide an improved gear checker.

Another object of this invention is to provide a magnetic and electronic gear checker having increased accuracy.

A further object of this invention is to provide a method of determining the eccentricity of a gear.

Still another object of this invention is to provide a means of checking the output of a given gear train compared to the input.

A still further object of this invention is to provide a method of determining the deviations of a gear from uniformity.

Other objects of invention will become apparent from the following description, taken in connection with the accompanying drawing, which is a diagram of the invention.

In the single drawing, a gear train is represented by worm 1 and gear 2. These gears represent the input and output of a given gear train and may be remote or proximate relative to each other. A magnetic reference, drum 3, is disposed on shaft 4 of worm 1. The input is derived from motor 5 rotating shaft 4. Magnetic head 6, which is preferably in contact with drum 3 reads the magnetic reference signals previously recorded on drum 3 and provides an input to amplifier 7.

A second magnetic reference, disc 8, is disposed to rotate with output gear 2. Magnetic head 9 reads the magnetic reference signals previously recorded on disc 8 and provides an input to amplifier 10. If the signals have been recorded on disc 8 and drum 3 at corresponding frequencies, depending on the gear ratio between input worm 1 and output gear 2, two similar signals will be read by heads 6 and 9. However, if there is any lag in the gearing, a phase shift will occur between the outputs of heads 6 and 9. A phase detector 11 provides a D.-C. output depending on the amount of phase shift and D.-C. amplifier 12 drives electrical recorder 13 accordingly. The D.-C. signal representing phase shift causes a deflection of recording stylus 14 in one direction or the other, and a continuous graph is made of the irregularities of the gear train. Deflection of the graphical line 15 from a base line 16 indicates the amount and direction of correction required in the gear train to give a precise output.

Switches 17 and 18 provide for using the elements of the device in a novel manner. In this embodiment, disc 8 has no signal previously recorded thereon. Before the checking commences, switches are thrown to "$w$" and motor 5 rotates gear 2 through one complete revolution. The pulses read by head 6 are amplified and recorded by head 9 upon disc 8. After a complete recording revolution, gear 2 is rotated 180° with respect to disc 8. The switches are then thrown to "$r$" and reading by both heads commences. If gear 2 is eccentric, the signals of heads 6 and 9 will have a phase shift relative to each other, the signals of head 6 first leading, then lagging the signals of head 9 or vice versa.

Having recorded the signal on disc 8 under drive conditions causes a first phase shift. Rotating gear 2, 180° causes a second phase shift in the same direction and, thus, eccentricity of gear 2 is doubly accentuated and greater sensitivity is obtained. If gear 2 only is being checked, worm 1 must be precision ground or its irregularities will add to the indicated variations.

If it is desired to more closely correlate the graph with the gear position, a shaft 19 may drive the reels of recorder 13 in synchronism with disc 8. This arrangement would permit turning the gear to a given position, after recording, and the defect of that position would be indicated on the graph at the recording stylus. Also, it would permit recording several cycles on a single loop of recording paper and, thus, average out the system noise or other disturbances. The stylus would have made five or six superimposed recordings and the average of the recordings would indicate the gear irregularities devoid of system noise.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In apparatus for checking a gear train, a first magnetic recording element having magnetic reference signals recorded thereon and adapted to be rotated in accordance with an input rotation, a first magnetic head disposed to read said magnetic reference signals as said first recording element rotates and having output signals in accordance therewith, a second magnetic recording element adapted to be rotated in accordance with an output rotation, said output rotation being mechanically actuated by said input rotation, a magnetic read-recorded head disposed to read and record magnetic signals on said second recording element as said second element rotates and having output signals in accordance with signals recorded on said second element, a phase detector adapted to receive the output of said heads, and switch means having two positions, the first of said positions connecting said output signals of said first head to said second head for recording said output signals of said first head on said second recording element, said second position connecting to said phase detector the outputs of said first and second heads in accordance with signals previously recorded respectively on said first and second recording elements.

2. In apparatus for checking a gear train, a plurality of gears comprising at least an input and an output gear driven thereby, a first magnetic recording element having magnetically recorded reference signals recorded thereon and adapted to be rotated in accordance with said input gear, a first magnetic head disposed to read said first magnetically recorded reference signals and having output signals in accordance therewith, a second magnetic recording element adapted to be rotated in accordance with said output gear, a read-record head adapted to read and record signals on said second magnetic recording element and having output signals in accordance with signals recorded on said second element, a phase detector adapted to receive the output of said heads, and switch means having two positions, the first of said positions connecting said output signals of said first head to said second head for recording said output signals of said first head on said second recording element, said second position connecting to said phase detector the outputs of said first and second heads in accordance with signals previously recorded respectively on said first and second recording elements.

3. The combination recited in claim 2 wherein is included means for graphically recording the electrical output signal of said phase detector, said graphical recording means being driven in synchronism with the rotation of said output gear.

4. In apparatus for checking a gear train, a plurality of gears comprising at least an input and an output gear driven thereby, a first magnetic recording element having magnetic reference signals recorded thereon and adapted to be rotated in accordance with said input gear, a first magnetic head disposed to read said magnetic signals and having output signals in accordance therewith, a second magnetic recording element adapted to be rotated in accordance with said output gear, a magnetic read-record head adapted to read and record signals from and on said second magnetic element and having output signals in accordance with signals recorded on said second recording element, a phase detector connected to determine the phase difference between said signals produced by said heads, and switch means having two positions, the first of said positions connecting said output signals of said first head to said second head for recording said output signals of said first head on said second recording element, said second position connecting to said phase detector the outputs of said first and second heads in accordance with signals previously recorded respectively on said first and second recording elements.

5. The method of checking the eccentricity of a gear comprising deriving signals from a first magnetically recorded reference rotated in synchronism with the input rotation to said gear, recording said signals on a magnetic element rotated in synchronism with the output rotation of said gear to produce a second magnetically recorded reference, rotating said gear 180 degrees with respect to said second magnetically recorded reference and then rotating the gear and second magnetically recorded reference in synchronism, deriving signals from said magnetically recorded reference, and determining the phase difference between said signals derived from said first magnetically recorded reference and said second magnetically recorded reference.

6. The combination recited in claim 5 wherein is included means for graphically recording the phase difference between said signals.

References Cited in the file of this patent
UNITED STATES PATENTS

| | | |
|---|---|---|
| 1,949,239 | Broadmeyer | Feb. 27, 1934 |
| 2,306,361 | Stuart | Dec. 22, 1942 |
| 2,346,976 | Langer | Apr. 18, 1944 |
| 2,387,901 | Haverstick | Oct. 30, 1945 |
| 2,437,048 | Salles | Mar. 2, 1948 |
| 2,623,293 | Nebesar | Dec. 30, 1952 |

FOREIGN PATENTS

| | | |
|---|---|---|
| 913,361 | Germany | June 10, 1954 |

OTHER REFERENCES

Proceedings Institute Electrical Engineers, vol. 98, No. 61, February 1951, pp. 29–34 (particularly 29 and 30).